(12) United States Patent
Brack et al.

(10) Patent No.: US 7,105,626 B2
(45) Date of Patent: Sep. 12, 2006

(54) METHOD FOR INCORPORATING ALKYL ESTER ENDGROUPS TO IMPROVE THE RELEASE PROPERTIES OF MELT POLYCARBONATE

(75) Inventors: Hans-Peter Brack, Herrliberg (CH); Dennis Karlik, Bergen op Zoom (NL); Jan Pleun Lens, Breda (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/938,337

(22) Filed: Sep. 10, 2004

(65) Prior Publication Data

US 2006/0074216 A1  Apr. 6, 2006

(51) Int. Cl.
*C08G 64/00* (2006.01)

(52) U.S. Cl. .................. 528/196; 264/176.1; 264/219; 528/198; 558/268

(58) Field of Classification Search ............. 264/176.1, 264/219; 528/196, 198; 558/268
See application file for complete search history.

(56) References Cited

U.S. PATENT DOCUMENTS

| | | | |
|---|---|---|---|
| 3,442,854 A | 5/1969 | Curtius et al. | |
| 4,323,668 A | 4/1982 | Brunelle | |
| 5,026,817 A | 6/1991 | Sakashita et al. | |
| 5,091,591 A | 2/1992 | Cipullo | |
| 5,097,002 A | 3/1992 | Sakashita et al. | |
| 5,142,018 A | 8/1992 | Sakashita et al. | |
| 5,151,491 A | 9/1992 | Sakashita et al. | |
| 5,276,129 A | 1/1994 | Sakashita et al. | |
| 5,340,905 A | 8/1994 | Kühling et al. | |
| 5,525,701 A | 6/1996 | Tominari et al. | |
| 5,696,222 A | 12/1997 | Kaneko et al. | |
| 6,177,536 B1 | 1/2001 | Anamizu et al. | |
| 6,252,036 B1 | 6/2001 | Hatono et al. | |
| 6,300,459 B1 * | 10/2001 | Kaneko et al. ............. 528/196 |
| 6,303,734 B1 | 10/2001 | Funakoshi et al. | |
| 6,399,739 B1 | 6/2002 | McCloskey et al. | |
| 6,403,754 B1 | 6/2002 | McCloskey et al. | |
| 6,410,777 B1 | 6/2002 | Kaneko et al. | |
| 6,417,291 B1 | 7/2002 | Kaneko et al. | |
| 6,420,512 B1 | 7/2002 | McCloskey et al. | |
| 6,420,588 B1 | 7/2002 | McCloskey et al. | |
| 6,469,192 B1 | 10/2002 | Burnell et al. | |
| 6,500,914 B1 | 12/2002 | Brack et al. | |
| 6,506,871 B1 | 1/2003 | Silvi et al. | |
| 6,518,391 B1 | 2/2003 | McCloskey et al. | |
| 6,525,163 B1 | 2/2003 | Brack et al. | |
| 6,548,623 B1 | 4/2003 | Brunelle et al. | |
| 6,590,068 B1 | 7/2003 | Brack et al. | |
| 6,600,004 B1 | 7/2003 | McCloskey et al. | |
| 6,653,434 B1 | 11/2003 | Brack et al. | |
| 6,706,846 B1 | 3/2004 | Brack et al. | |
| 6,710,156 B1 * | 3/2004 | Whitney et al. ............. 528/196 |
| 6,723,823 B1 | 4/2004 | McCloskey et al. | |
| 6,734,277 B1 | 5/2004 | Brack et al. | |
| 6,747,119 B1 | 6/2004 | Brack et al. | |
| 2002/0132957 A1 | 9/2002 | Brack et al. | |
| 2003/0105271 A1 | 6/2003 | Brack et al. | |
| 2003/0111156 A1 * | 6/2003 | McNichols et al. ........ 156/73.1 |
| 2003/0120025 A1 | 6/2003 | Brack et al. | |
| 2004/0068086 A1 | 4/2004 | Day et al. | |
| 2004/0087756 A1 | 5/2004 | Ramesh et al. | |

FOREIGN PATENT DOCUMENTS

| | | |
|---|---|---|
| EP | 0764 673 B1 | 11/1999 |
| EP | 0976 772 A1 | 2/2000 |
| EP | 0980 861 A1 | 2/2000 |
| EP | 0985 696 A1 | 3/2000 |
| JP | 5009282 A2 | 1/1993 |
| JP | 1993009283 A | 1/1993 |
| JP | 1994157739 A | 6/1994 |
| JP | 10-101786 A2 | 4/1998 |
| JP | 10-101787 A2 | 4/1998 |
| JP | 11-302228 | 11/1999 |
| JP | 2000129112 A | 5/2000 |
| JP | 2002-309015 A2 | 10/2002 |
| WO | WO 03/040208 A1 | 5/2003 |
| WO | WO 03/106149 A1 | 12/2003 |

* cited by examiner

*Primary Examiner*—Terressa Boykin
(74) *Attorney, Agent, or Firm*—Marina Larson & Associates, LLC

(57) ABSTRACT

Alkyl ester end-capped polycarbonates have improved release properties and may be produced by a method comprising the step of combining a polycarbonate having free terminal OH groups with an end-capping reagent comprising a symmetrical activated carbonate and an alkyl ester, whereby the end-capping reagent reacts with at least some of the free hydroxyl end groups of the polycarbonate to produce an end-capped polycarbonate comprising optionally substituted aliphatic ester end groups.

35 Claims, No Drawings

METHOD FOR INCORPORATING ALKYL ESTER ENDGROUPS TO IMPROVE THE RELEASE PROPERTIES OF MELT POLYCARBONATE

BACKGROUND OF THE INVENTION

This application relates to a method for end-capping polycarbonate resins and to end-capping compositions useful in such a method.

Polycarbonate is excellent in mechanical properties such as impact resistance and is also excellent in heat resistance and transparency, and it is widely used in industrial application. As a method of producing a polycarbonate, there is known a method in which phosgene is directly reacted with an aromatic diol such as bisphenol A (a.k.a. the interfacial polymerization method) or in which an aromatic dihydroxy compound such as bisphenol and a diaryl carbonate such as diphenyl carbonate are reacted in ester exchange in a molten state (a.k.a. melt-polycondensation method).

Polycarbonates prepared by a melt transesterification process generally contain significant levels of uncapped chains (7–50%) as compared to interfacially prepared polycarbonates. These uncapped chains can have a significant impact on the resulting properties of polycarbonate, and it is therefore desirable in many instances to include an end-capping reagent with a higher capping efficiency than diphenyl carbonate (DPC) during or after the polymerization reaction which terminates the uncapped chains. Further, when a polycarbonate is produced, attempts are made to use a terminal blocking reagent for improving the polycarbonate in polymer properties such as a hue, heat resistance and hydrolysis resistance.

U.S. Pat. No. 5,696,222 describes a process for production of a terminally-blocked polycarbonate by melt transesterification of a dihydric phenol and a diaryl carbonate in the presence of an asymmetric substituted phenol ester or carbonate as an end-capping reagent, and in particular end-capping reagents which are salicylic acid derivatives. European Patent Publication No. 0 980 861 discloses another method for making such derivatives. These end-capping reagents are derived from one salicylate (activated) and one non-activated phenol. While such end-capping reagents may be effective, they are not without their drawbacks. Specifically, such asymmetric carbonates require two separate steps for their preparation (generation of a chloroformate from one of the phenols, followed by condensation with the second phenol). This two step process adds significantly to the cost of the end-capping reagent. An additional deficiency of this method is that the asymmetric mixed carbonates prepared in this way are often contaminated with traces of nitrogen- and halogen-containing impurities and with symmetrical carbonates derived from one or both of the phenols used in the reaction. As a consequence, in order to obtain materials of suitable quality for polymerization, purification is often both essential and difficult.

Thus it would be beneficial to find a method to incorporate alkyl ester as an end group of polycarbonate while minimizing the cost of the end-capping reagent while maximizing the purity of the reagent and enhancing the efficiency of the process.

SUMMARY OF THE INVENTION

Applicants have determined a superior method for producing alkyl ester end-capped polycarbonate using the end-capping reagent of the present invention. An embodiment of the present invention provides a method for preparing an end-capped polycarbonate, comprising the step of:

combining a polycarbonate having free terminal OH groups with an end-capping reagent comprising a symmetrical activated carbonate and a compound A, wherein compound A has the structure,

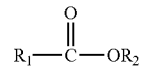

wherein $R_1$ is selected from the group consisting of a branched $C_8$–$C_{40}$ alkyl and a linear $C_8$–$C_{40}$ alkyl; and $R_2$ is selected from the group consisting of hydrogen, a branched $C_3$–$C_{40}$ alkyl, a linear $C_1$–$C_{40}$ alkyl, $C_6$–$C_{30}$ aryl, and $C_7$–$C_{30}$ aralkyl group, or wherein compound A is an esterified polyol having the formula $C(COCOR_3)_4$ wherein $R_3$ is a $C_{10}$–$C_{40}$ alkyl or a $C_{10}$–$C_{40}$ alkenyl group, whereby the end-capping reagent reacts with at least some of the free hydroxyl end groups of the polycarbonate to produce an end-capped polycarbonate comprising optionally substituted aliphatic ester end groups.

The present invention has several advantages over the prior art. The present invention provides a superior method for producing a polycarbonate with a high level of alkyl ester end-capped chains. A high level of end-capping of the chains provides a high stability of the resulting polycarbonate. It has been found that by using the combination of a symmetrical activated carbonate and component (A) as the end-capping reagent, the alkyl ester end-capping reaction runs to a high level of completion in a minimal amount of time and expense.

Alkyl esters, when added as an additive to form a blend to polycarbonate provide several beneficial properties including superior mold release properties of the polycarbonate. However, when added as an additive to form a blend the alkyl ester may "plate-out" of the polycarbonate and deposit on the mold thereby forming molded articles with byproduct on its surface. By making the alkyl ester an inherent part of the polycarbonate as an end group, "plate-out" is minimized in the production of molded polycarbonate products while the desired mold release properties are retained. By minimizing "plate-out" the production process is further streamlined since the process does not need to be shut down in order to clean the "plate-out" from the equipment or the molded articles.

DETAILED DESCRIPTION OF THE INVENTION

The present invention may be understood more readily by reference to the following detailed description of preferred embodiments of the invention and the examples included therein.

In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not. Thus, the term "optionally substituted" means that carbon atoms in a molecule may have only hydrogen substituents, or they may have other substituents as desired. In general, unless the context clearly indicates otherwise, terms such as alkyl or aryl encompass both substituted and unsubstituted groups of the stated type.

"Polycarbonate" refers to polycarbonates incorporating repeat units derived from at least one dihydroxy aromatic compound and includes copolyestercarbonates, for example a polycarbonate comprising repeat units derived from resorcinol, bisphenol A, and dodecandioic acid. Nothing in the description and claims of this application should be taken as limiting the polycarbonate to only one dihydroxy residue unless the context is expressly limiting. Thus, the application encompasses copolycarbonates with residues of 2, 3, 4, or more types of dihydroxy compounds.

"Melt polycarbonate" refers to a polycarbonate made by the transesterification of a diarylcarbonate with at least one dihydroxy compound.

"Catalyst system" as used herein refers to a catalyst or catalysts that catalyze the transesterification of a dihydroxy aromatic compound with a diarylcarbonate in the preparation of melt polycarbonate.

"Catalytically effective amount" refers to an amount of a catalyst at which catalytic performance is exhibited.

"Dihydroxy aromatic compound(s)" means an aromatic compound which comprises two hydroxy groups on one or more aromatic rings, for example a bisphenol such as bisphenol A or a dihydroxy benzene such as resorcinol.

"Dihydroxy compound(s)" are not limited to dihydroxy aromatic compound(s).

"BPA" is herein defined as bisphenol A or 2,2-bis(4-hydroxyphenyl)propane.

"Aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

"Cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclopropyl, cyclopentyl, cyclohexyl, tetrahydrofuranyl and the like.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

The Process:

The present invention provides a method for end-capping a polycarbonate, comprising the step of:

combining a polycarbonate having free terminal OH groups with an end-capping reagent comprising a symmetrical activated carbonate and a compound A, wherein compound A has the structure,

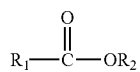

wherein $R_1$ is selected from the group consisting of a branched $C_8$–$C_{40}$ alkyl and a linear $C_8$–$C_{40}$ alkyl; and $R_2$ is selected from the group consisting of hydrogen, a branched $C_3$–$C_{40}$ alkyl, a linear $C_1$–$C_{40}$ alkyl, $C_6$–$C_{30}$ aryl, and $C_7$–$C_{30}$ aralkyl group, or wherein compound A is an esterified polyol having the formula $C(COCOR_3)_4$ wherein $R_3$ is a $C_{10}$–$C_{40}$ alkyl or a $C_{10}$–$C_{40}$ alkenyl group, whereby the end-capping reagent reacts with at least some of the free hydroxyl end groups of the polycarbonate to produce an end-capped polycarbonate comprising optionally substituted aliphatic ester end groups.

The production of hydroxy terminated polycarbonates is not particularly limited and is well-known in the art and described, for example, in Organic Polymer Chemistry by K. J. Saunders, 1973, Chapman and Hall Ltd., as well as in a number of U.S. patents, including U.S. Pat. Nos. 3,442,854; 5,026,817; 5,097,002; 5,142,018; 5,151,491; and 5,340,905.

Hydroxy terminated polycarbonate can be produced by the melt polycondensation of dihydroxy compounds and a carbonate source. The reaction can be carried out by either a batch mode or a continuous mode. The apparatus in which the reaction is carried out can be any suitable type of tank, tube, or column. The continuous processes usually involve the use of one or more continuously stirred tank reactors and one or more finishing reactors.

The term "melt or transesterification process conditions" will be understood to mean those conditions necessary to effect reaction between a diarylcarbonate and a dihydroxy compounds employed according to the method of the present invention. The reaction temperature is typically in the range between 150° C. and 350° C., more preferably between 180° C. and 310° C. The pressure may be at atmospheric pressure, supra atmospheric pressure, or a range of pressures, for example from 2 atmospheres to 15 torr in the initial stages of the polymerization reaction, and at a reduced pressure at later stages, for example in a range between 15 torr and 0.1 torr. The reaction time is generally in a range between 0.1 hours and 10 hours, preferably between 0.1 and 5 hours.

The End-Capping Reagent:

The end-capping reagent of the present invention comprises an alkyl ester (compound A) and a symmetrical activated carbonate. Compound A has the structure,

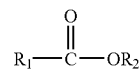

wherein $R_1$ is selected from the group consisting of a branched $C_8$–$C_{40}$ alkyl and a linear $C_8$–$C_{40}$ alkyl and $R_2$ is selected from the group consisting of hydrogen, a branched $C_3$–$C_{40}$ alkyl, a linear $C_1$–$C_{40}$ alkyl, $C_6$–$C_{30}$ aryl, and $C_7$–$C_{30}$ aralkyl group, or compound A is an esterified polyol having the formula $C(COCOR_3)_4$ wherein $R_3$ is a $C_{10}$–$C_{40}$ alkyl or a $C_{10}$–$C_{40}$ alkenyl group.

The preferred composition of compound A is typically stearic acid because it is inexpensive and easy to use. However, other types of compounds are suitable for use. A non-limiting list of examples of compounds with formula (A) include lauric acid, myristic acid, palmitic acid, stearic acid, arachidic acid, behenic acid, oleic acid, lignoceric acid eicansoic acid, the alkyl esters of these acids, their aryl esters and mixtures thereof (e.g. tallow fatty acid). Further, glycerol-mono-stearate and penta erythritol-tetra-stearate (PETS) are suitable examples of compound A.

The endcapping reagent also comprises a symmetrical activated carbonate. As used herein the term "activated carbonate" is defined as a diarylcarbonate which is more reactive than diphenylcarbonate toward transesterification reactions. Such activated carbonates are of the general formula:

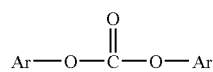

wherein Ar is a substituted aromatic radical having 6 to 30 carbon atoms. The preferred symmetrical activated carbonates have the more specific general formula:

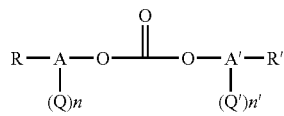

wherein Q and Q' are each the same activating groups and A and A' are each the same aromatic rings. R and R' are each the same groups such as alkyl, substituted alkyl, cycloalkyl, alkoxy, aryl, alkylaryl, cyano, nitro, halogen, and carboalkoxy. The number of R and R' groups is a whole number and can be 0 up to a maximum equivalent to the number of replaceable hydrogen groups on the aromatic rings A or A' minus the number n or n'. The number, type, and location of the R and R' substituents on the aromatic ring are not limited unless they deactivate the carbonate and lead to a carbonate which is less reactive than diphenylcarbonate.

Non-limiting examples of activating groups Q and Q' are: alkoxycarbonyl groups, halogens, nitro groups, amide groups, sulfone groups, sulfoxide groups, or imine groups with structures indicated below:

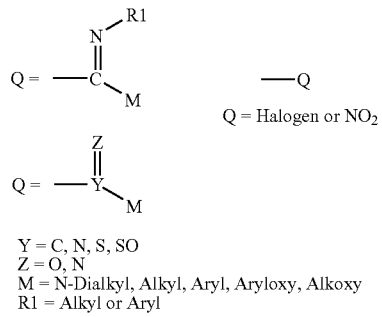

Y = C, N, S, SO
Z = O, N
M = N-Dialkyl, Alkyl, Aryl, Aryloxy, Alkoxy
R1 = Alkyl or Aryl Specific and non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. A preferred structure for a symmetrical activated carbonate is an ester-substituted diarylcarbonate having the structure:

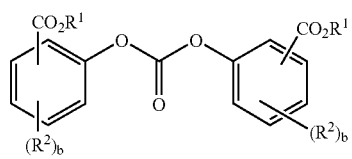

wherein $R^1$ is a $C_1$–$C_{20}$ alkyl radical, $C_4$–$C_{20}$ cycloalkyl radical, or $C_4$–$C_{20}$ aromatic radical; $R^2$ is a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and b is independently at each occurrence an integer 0–4. At least one of the substituents $CO_2R^1$ is preferably attached in an ortho position relative to the carbonate group.

Examples of preferred ester-substituted diarylcarbonates are symmetrical activated diaryl carbonates and include but are not limited to bis(methylsalicyl)carbonate (BMSC) (CAS Registry No. 82091-12-1), bis(ethyl salicyl)carbonate, bis(propyl salicyl) carbonate, bis(butylsalicyl) carbonate, bis(benzyl salicyl)carbonate, bis(methyl 4-chlorosalicyl)carbonate and the like. See Table 1. Typically BMSC is preferred for use in melt polycarbonate synthesis due to its lower molecular weight and higher vapor pressure.

TABLE 1

Examples of Symmetrical Activated Carbonates

| Structure | Name (abbreviation) | Data |
|---|---|---|
| | Bis-methylsalicylate carbamate (bMSC) | MW = 330 mp 109° C.[1] |

TABLE 1-continued

Examples of Symmetrical Activated Carbonates

| Structure | Name (abbreviation) | Data |
|---|---|---|
| [BPA-bis-methylsalicylate carbonate structure] | BPA-bis-methylsalicylate carbonate | MW = 572 |
| [Bis-ethyl salicylate carbonate structure] | Bis-ethyl salicylate carbonate | MW = 358 |
| [Bis-propyl salicylate carbonate structure] | Bis-propyl salicylate carbonate (bPrSC) | MW = 386<br>mp = 57–58° C. |
| [bis-2-benzoylphenyl carbonate structure] | bis-2-benzoylphenyl carbonate | MW = 442<br>mp = 111–112° C. |
| [Bis-phenyl salicyl carbonate structure] | Bis-phenyl salicyl carbonate (bPbSC) | MW = 454 |
| [Bis-benzyl salicyl carbonate structure] | Bis-benzyl salicyl carbonate (bBSC) | MW = 482<br>mp = 68.5–71° C. |

One method for determining whether a certain diarylcarbonate is activated or is not activated is to carry out a model transesterification reaction between the certain diarylcarbonate with a phenol such as p-(1,1,3,3-tetramethyl)butylphenol. This phenol is preferred because it possesses only one reactive site, possesses a low of volatility and possesses a similar reactivity to bisphenol-A. The model transesterification reaction was carried out at temperatures above the melting points of the certain diarylcarbonate and p-(1,1,3,3-tetramethyl)butylphenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diarylcarbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and affect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05% (v/v). The equilibrium constant was determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diarylcarbonate which possesses a relative equilibrium constant ($K_{test}/K_{DPC}$) of greater than 1 is considered to possess a more favorable equilibrium than diphenylcarbonate and is an activated carbonate, whereas a diarylcarbonate which possesses an equilibrium constant of 1 or less is considered to possess the same or a less favorable equilibrium than diphenylcarbonate and is considered not to be activated. It is generally preferred to employ a symmetrical activated carbonate with very high reactivity compared to diphenylcarbonate when conducting transesterification reactions. Preferred are activated carbonates with an equilibrium constant greater than at least 10 times that of diphenylcarbonate.

Some non-limiting examples of non-activating groups which, when present in an ortho position relative to the carbonate group, would not be expected to result in activated carbonates are alkyl, cycolalkyl or cyano groups. Some specific and non-limiting examples of non-activated carbonates are bis(o-methylphenyl)carbonate, bis(p-cumylphenyl) carbonate, bis(p-(1,1,3,3-tetramethyl)butylphenyl)carbonate and bis(o-cyanophenyl)carbonate. Unsymmetrical combinations of these structures are also expected to result in non-activated carbonates.

The carbonate may also be derived from dicarboxylic acids, dicarboxylic acid esters, or dicarboxylic acid halides. Such constituent repeating units are typically polyester-polycarbonate units. Non-limiting examples of dicarboxylic acids include terephthalic acid, isophthalic acid, sebacic acid, decanedioic acid, dodecanedioic acid, etc. Non-limiting examples of dicarboxylic acid esters include diphenyl sebacate, diphenyl terephthalate, diphenyl isophthalate, diphenyl decanedioate, diphenyl dodecanedioate, etc. Non-limiting examples of dicarboxylic acid halides include terephthaloyl chloride, isophthaloyl chloride, sebacoyl chloride, decanedioyl chloride, dodecanedioyl chloride, etc. Such polyester-polycarbonate units may be present in proportions of up to 50 mole %, preferably not more than 30 mole %, in copolymerized polycarbonates in accordance with the present invention.

End-capping Reaction Process:

In accordance with an embodiment of the method of the invention, the end-capping reagent is combined with a preformed polycarbonate polymer having free hydroxyl end groups. The end-capping reagent rapidly caps the terminal hydroxy groups of the polycarbonate. The preformed polycarbonate polymer may be any type of polycarbonate, and can be formed by a melt transesterification reaction.

The method of adding the end-capping reagent to polycarbonate is not specially limited. For example, the end-capping reagent may be added to the polycarbonate as a reaction product in a batch reactor or a continuous reactor system. In one embodiment, the end-capping reagent is added to the melt polycarbonate just before or after a late stage reactor, i.e., a polymerizer, in a continuous reactor system. In a second embodiment, the end-capping reagent is added by reactive extrusion after the last polymerizer in the continuous reactor system. In a third embodiment, it is added between the first and second polymerizer in a continuous reactor system. In a fourth embodiment, the end-capping reagent is added between a second reactor and a first polymerizer. In a fifth embodiment the polycarbonate to which the end-capping reagent is added has a number average molecular weight $M_n$ of at least 2,000 Daltons, more preferably between 2,000 and 15,000 Daltons, still more preferably between 6,000 and 13,000, and yet more preferably between 7,000 and 12,000. In a sixth embodiment the polycarbonate to which the end-capping reagent is added has a hydroxyl end group content of at least 25% and more preferably a hydroxyl end group content of at least 40%.

In an embodiment of the present invention, the end-capping reagent is added to a polycarbonate containing free hydroxyl end groups prior to extrusion at a temperature of between 250° C. and 300° C. and at a pressure of between 0.1 mbar and 1.0 mbar. Reactive extrusion is carried out on a devolatilization type extruder to provide the end-capped polycarbonate of the present invention.

The relative amounts of the symmetrical activated carbonate and component (A) in the end-capping reagent can be varied depending on the product characteristics desired. In general, the mole ratio of symmetrical activated carbonate to component (A) will suitably range from 0.1 to 10, more preferably from 0.5 to 2.0, yet more preferably 0.9 to 2.0, and still more preferably from 1.1 to 2.0.

The end-capped polycarbonate may still contain small amounts of any unrecovered phenols, any unreacted end-capping reagent along with by-products of any side reactions to the end-capping reactions, and the like. In one embodiment, the end-capped polycarbonate contains less than 500 ppm and more preferably less than 200 ppm of ortho-substituted phenols. In another embodiment of the present invention the end-capped polycarbonate contains less than 500 ppm and more preferably less than 100 ppm of unreacted terminal blocking compound (A) of the present invention. In another embodiment, the end-capped polycarbonate contains less than 2,500 ppm and more preferably less than 1,000 ppm of terminal 2-(alkoxycarbonyl)phenyl, 2-(phenoxycarbonyl)phenyl, 2-(benzyloxycarbonyl)phenyl, and 2-benzoylphenyl groups.

Optional Terminators/End-capping Reagents:

In one embodiment of the present invention, additional/optional terminators or end-capping reagents of the prior art may also be used. Examples of terminators include phenol, p-tert-butylphenol, p-cumylphenol, octylphenol, nonylphenol, and other end-capping reagents well-known in the art.

In one embodiment of the process of the present invention, branching agents are used as needed. Branching agents are well-known and may comprise polyfunctional organic compounds containing at least three functional groups, which may be hydroxyl, carboxyl, carboxylic anhydride, and mixtures thereof. Specific examples include trimellitic anhydride, tris-p-hydroxy phenyl ethane, isatin-bis-phenol, tris-phenol TC (1,3,5-tris((p-hydroxyphenyl) isopropyl)benzene), tris-phenol PA (4(4(1,1-bis(p-hydroxyphenyl)-ethyl) alpha, alpha-dimethyl benzyl)phenol, and benzophenone tetracarboxylic acid. Optional catalysts. The polycarbonate synthesis may be conducted in the presence of a catalyst to promote the transesterification reaction. Examples include alkali metals and alkaline earth metals by themselves or as oxides, hydroxides, amide compounds, alcoholates, and phenolates, basic metal oxides such as ZnO, PbO, and $Sb_2O_3$, organotitanium compounds, soluble manganese compounds, nitrogen-containing basic compounds and acetates of calcium, magnesium, zinc, lead, tin, manganese, cadmium, and cobalt, and compound catalyst systems such as a nitrogen-containing basic compound and a boron compound, a nitrogen-containing basic compound and an alkali (alkaline earth) metal compound, and a nitrogen-containing basic compound, an alkali (alkaline earth) metal compound, and a boron compound.

Other Optional Components in the Polycarbonate:

In the present invention, the polycarbonate obtained may further comprise a heat stabilizer, an ultraviolet absorbent, a mold releasing agent, a colorant, an anti-static agent, a lubricant, an anti-fogging agent, a natural oil, a synthetic oil, a wax, an organic filler and an inorganic filler, which are generally used in the art.

It is also an aspect of the present invention to provide a molded article and a method for making a molded article comprising the steps of:

(i) combining a polycarbonate having free terminal OH groups with an end-capping reagent comprising a symmetrical activated carbonate and a compound A, wherein compound A has the structure,

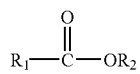

wherein $R_1$ is selected from the group consisting of a branched $C_8$–$C_{40}$ alkyl and a linear $C_8$–$C_{40}$ alkyl; and $R_2$ is selected from the group consisting of hydrogen, a branched $C_3$–$C_{40}$ alkyl, a linear $C_1$–$C_{40}$ alkyl, $C_6$–$C_{30}$ aryl, and $C_7$–$C_{30}$ aralkyl group, or wherein compound A is an esterified polyol having the formula $C(COCOR_3)_4$ wherein $R_3$ is a $C_{10}$–$C_{40}$ alkyl or a $C_{10}$–$C_{40}$ alkenyl group, whereby the end-capping reagent reacts with at least some of the free hydroxyl end groups of the polycarbonate to produce an end-capped polycarbonate comprising optionally substituted aliphatic ester end groups, and (ii) forming a molded article from the end-capped polycarbonate produced in step (i).

EXAMPLES

Having described the invention in detail, the following examples are provided. The examples should not be considered as limiting the scope of the invention, but merely as illustrative and representative thereof.

Starting Material Polycarbonate:

In all examples, starting polycarbonate grade A was used. The starting material was prepared by a melt process in a continuous reactor system with the following properties:

| | Polycarbonate A |
|---|---|
| Weight-average molecular weight Mw: | $19.5 * 10^3$ g/mole |
| Number-average molecular weight Mn: | $8.62 * 10^3$ g/mole |

-continued

| | Polycarbonate A |
|---|---|
| Free OH content: | 2209 ppm |
| End-cap ratio | 44% |

In the Examples, the Following Measurements were Made:

a) Molecular weight: $M_w$ and $M_n$ were measured by GPC analysis of 1 mg/ml polymer solutions in methylene chloride versus polystyrene standards. The measured polycarbonate $M_w$ and $M_n$ values were then corrected for the difference in retention volume between polycarbonate and polystyrene standards.

b) Free-OH content was measured by NMR spectroscopy.

c) The incorporated amount of alkyl ester end group was measured by NMR spectrometry.

d) End-cap levels were calculated from the free OH content and $M_n$ values.

Example 1

A batch reactor tube was charged under nitrogen with 25 g of polycarbonate A and 0.9241 g ($3.25 \times 10^{-3}$ mole) of stearic acid and 0.5364 g of bis(methyl salicyl) carbonate or bMSC ($1.62 \times 10^{-3}$ mole). Thus the stearic acid was added in a molar ratio of 1.0 relative to the free OH content of the polycarbonate A, and the bMSC in a molar ratio of 0.5 relative to the free OH content of the polycarbonate A. The mixture was heated to a temperature of 270° C. and stirred for 10 minutes. After the melt mixing stage a vacuum was applied to the system at a pressure of 0.5 mbar and the reaction continued for 40 minutes. After the reaction stage, a colorless polymer was recovered from the reaction tube. The results are shown in Table 2.

Example 2

Example 1 was repeated but instead of adding 1.0728 g ($3.25 \times 10^{-3}$ mole) of bis(methyl salicyl) carbonate or bMSC, 0.9656 g ($2.92 \times 10^{-3}$ mole) of bMSC was charged to the reactor tube. After the reaction stage, a colorless polymer was sampled from the reaction tube. The results are shown in Table 2.

Example 3

Example 1 was repeated but instead of adding 1.0728 g ($3.25 \times 10^{-3}$ mole) of bis(methyl salicyl) carbonate or bMSC, 1.0728 g ($3.25 \times 10^{-3}$ mole) of bMSC was charged to the reactor tube. After the reaction stage, a colorless polymer was sampled from the reaction tube. The results are shown in Table 2.

Example 4

Example 1 was repeated but instead of adding 1.0728 g ($3.25 \times 10^{-3}$ mole) of bis(methyl salicyl) carbonate or bMSC, 1.6093 g ($4.87 \times 10^{-3}$) mole of bMSC was charged to the reactor tube. After the reaction stage, a colorless polymer was sampled from the reaction tube. The results are shown in Table 2.

Example 5

Example 3 was repeated but instead of adding stearic acid, 0.6507 g ($3.25 \times 10^{-3}$ mole) lauric acid was charged to the reactor tube. After the reaction stage, a colorless polymer was sampled from the reaction tube. The results are shown in Table 2.

Example 6

Example 3 was repeated but instead of adding stearic acid, 0.1015 g ($3.25 \times 10^{-3}$ mole) of eicosanoic acid was charged to the reactor tube. After the reaction stage, a colorless polymer was sampled from the reaction tube. The results are shown in Table 2.

Example 7

Example 3 was repeated but instead of adding stearic acid, 0.9697 g ($3.25 \times 10^{-3}$ mole) of methyl stearate and 1.0728 g ($3.248 \times 10^{-3}$ mole) of bMSC were charged to the reactor. After the reaction stage, a colorless polymer was sampled from the reaction tube. The results are shown in Table 2.

Example 8

Example 3 was repeated but instead of adding stearic acid, 1.1714 g ($3.25 \times 10^{-3}$ mole) of phenyl stearate and 1.0728 g ($3.25 \times 10^{-3}$ mole) of bMSC were charged to the reactor. After the reaction stage, a colorless polymer was sampled from the reaction tube. The results are shown in Table 2.

Comparative Example 1

The procedure of example 3 was repeated but no end-capping reagent was used. The results are shown in Table 2.

Comparative Example 2

The procedure of example 7 was repeated but only 0.9241 g ($3.25 \times 10^{-3}$ mole) of stearic acid was charged to the reactor. The results are shown in Table 2.

Comparative Example 3

The procedure of example 7 was repeated but only 0.9697 g ($3.25 \times 10^{-3}$ mole) of methyl stearate was charged to the reactor. The results are shown in Table 2.

Comparative Example 4

The procedure of example 8 was repeated but only 1.1714 g ($3.25 \times 10^{-3}$ mole) of phenyl stearate was charged to the reactor. The results are shown in Table 2.

TABLE 2

Results Invention examples and Comparative examples.

| | EC combi | bMSC:EC | Mw, PC (g/mole) | Mn, PC (g/mole) | EC Incorp. (mole %) | Free-OH (ppm) | EC (%) |
|---|---|---|---|---|---|---|---|
| Examples | | | | | | | |
| 1 | bMSC + stearic acid | 0.5 | 13856 | 6815 | 2.78 | 1990 | 60 |
| 2 | bMSC + stearic acid | 0.9 | 16232 | 7760 | 2.85 | 971 | 78 |
| 3 | bMSC + stearic acid | 1 | 16686 | 7769 | 2.98 | 752 | 83 |
| 4 | bMSC + stearic acid | 1.5 | 18248 | 8741 | 2.92 | 56 | 99 |
| 5 | bMSC + lauric acid | 1 | 21444 | 10393 | 2.82 | 287 | 91 |
| 6 | bMSC + eicosanoic acid | 1 | 20925 | 10549 | 3.07 | 295 | 91 |
| 7 | bMSC + Me-stearate | 1 | 26649 | 11290 | 0.59 | 64 | 98 |
| 8 | bMSC + Ph-stearate | 1 | 22146 | 9661 | 1.09 | 56 | 98 |
| Comparative Examples | | | | | | | |
| 1 | Blank | — | 22437 | 9527 | — | 2347 | 34 |
| 2 | stearic acid | 0:1 | 12725 | 6548 | 2.53 | 2950 | 43 |
| 3 | Me-stearate | 0:1 | 26027 | 10402 | 0.84 | 2009 | 39 |
| 4 | Ph-stearate | 0:1 | 20621 | 9651 | 0.95 | 1849 | 48 |

Results:

Examples 1–8 demonstrate that by incorporating the alkyl ester into the polycarbonate as an end-capper a colorless alkyl ester end-capped polymer is obtained. Specifically examples 1–4 illustrate that adding a fatty acid together with a symmetrical activated carbonate to a polycarbonate having terminal free OH groups is a more effective process to introduce alkyl ester end groups to a polycarbonate than the prior art method of adding a phenyl ester (Comparative example 4). In particular the present invention results in the incorporation of a much higher percentage of the alkyl ester end group. Also, the end-cap level of the resulting polycarbonate is higher than that obtained using the prior art method with a phenyl ester (Comparative example 4) or the control sample to which no end-capper was added (Comparative example 1).

Examples 1–4 demonstrate that the ratio of BMSC/end-capper determines the molecular weight and the end-cap ratio of the final product. The higher the ratio, the higher the molecular weight retention and the higher the end-cap ratio. Without the addition of BMSC, the molecular weight would decrease to an unacceptable low value and the percent end-cap would remain at an unacceptable low value (Comparative example 2).

Examples 5 and 6 demonstrate that the present method can be used to incorporate a variety of chain length alkyl ester end groups.

Examples 7 and 8 show that with the present method the end-cap level can be increased to almost 100% (Comparative examples 3 and 4).

The invention claimed is:

1. A method for preparing an end-capped polycarbonate, comprising the step of:
combining a polycarbonate having free terminal OH groups with an end-capping reagent comprising a symmetrical activated carbonate and a compound A, wherein compound A has the structure,

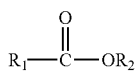

wherein $R_1$ is selected from the group consisting of a branched $C_8$–$C_{40}$ alkyl and a linear $C_8$–$C_{40}$ alkyl; and $R_2$ is selected from the group consisting of hydrogen, a branched $C_3$–$C_{40}$ alkyl, a linear $C_1$–$C_{40}$ alkyl, $C_6$–$C_{30}$ aryl, and $C_7$–$C_{30}$, aralkyl group,
or wherein compound A is an esterified polyol having the formula $C(COCOR_3)_4$ wherein $R_3$ is a $C_{10}$–$C_{40}$ alkyl or a $C_{10}$–$C_{40}$ alkenyl group,
whereby the end-capping reagent reacts with at least some of the free hydroxyl end groups of the polycarbonate to produce an end-capped polycarbonate comprising optionally substituted aliphatic ester end groups.

2. The method according to claim 1, wherein the molar ratio of symmetrical activated carbonate to compound A in the end-capping reagent is between 0.5 and 2.0.

3. The method according to claim 2, wherein the molar ratio of symmetrical activated carbonate to compound A in the end-capping reagent is between 1.1 and 2.0.

4. The method of claim 1, wherein compound A of the end-capping reagent is selected from the group consisting of lauric acid, myristic acid, palmitic acid, stearic acid, arachidic acid, behenic acid, lignoceric acid, the alkyl esters of these acids, and their aryl esters.

5. The method of claim 4, wherein compound A of the end-capping reagent is stearic acid.

6. The method of claim 1, wherein compound A is an esterified polyol and is penta erythritol-tetra-stearate (PETS).

7. The method according to claim 1, wherein the symmetrical activated carbonate of the end-capping reagent has the structure,

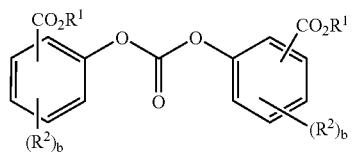

wherein $R^1$ is a $C_1$–$C_{20}$ alkyl radical, $C_4$–$C_{20}$ cycloalkyl radical, or $C_4$–$C_{20}$ aromatic radical; $R^2$ is a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{10}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and b is independently at each occurrence an integer 0–4.

8. The method according to claim 7, wherein the symmetrical activated carbonate of the end-capping reagent is selected from the group consisting of: bis-methyl salicylate carbonate (BMSC), BPA-bis-methyl salicylate carbonate, bis-ethyl salicylate carbonate, bis-propyl salicylate carbonate, bis-2-benzoylphenyl carbonate, bis-phenyl salicyl carbonate, and bis-benzyl salicyl carbonate.

9. The method according to claim 8, wherein the symmetrical activated carbonate of the end-capping reagent is bis-methyl salicylate carbonate (BMSC).

10. The method of claim 1, wherein the symmetrical activated carbonate of the end-capping reagent is added in an amount of 0.1 to 2 mole based on 1 mole equivalent of the free terminal —OH groups of the polycarbonate at the time of the addition.

11. The method of claim 1, wherein the symmetrical activated carbonate of the end-capping reagent is added in an amount of 0.8 to 1.3 mole based on 1 mole equivalent of the free terminal —OH groups of the polycarbonate at the time of the addition.

12. The method of claim 1, wherein the formed polycarbonate has a content of end-capping reagent of 500 ppm or below.

13. The method of claim 12, wherein the formed polycarbonate has a content of end-capping reagent of 100 ppm or below.

14. The method according to claim 1, wherein the formed polycarbonate has a content of terminal 2-(alkoxycarbonyl)phenyl, 2-(phenoxycarbonyl)phenyl, 2-(benzyloxycarbonyl)phenyl, and 2-benzoylphenyl groups of 2,500 ppm or below.

15. The method according to claim 14, wherein the formed polycarbonate has a content of terminal 2-(alkoxycarbonyl)phenyl, 2-(phenoxycarbonyl)phenyl, 2-(benzyloxycarbonyl)phenyl, and 2-benzoylphenyl groups of 1,000 ppm or below.

16. The method according to claim 1, wherein the formed polycarbonate has a content of ortho-substituted phenols of 500 ppm or below.

17. The method according to claim 16, wherein the formed polycarbonate has a content of ortho-substituted phenols of 200 ppm or below.

18. The method according to claim 1, wherein the polycarbonate to which the end-capping reagent is added has a number average molecular weight $M_n$ of at least 2,000 Daltons.

19. The method according to claim 18, wherein the polycarbonate to which the end-capping reagent is added has a number average molecular weight $M_n$ of between 2,000 and 15,000 Daltons.

20. The method according to claim 19, wherein the polycarbonate to which the end-capping reagent is added has a number average molecular weight $M_n$ of between 6,000 and 13,000 Daltons.

21. The method according to claim 20, wherein the polycarbonate to which the end-capping reagent is added has a number average molecular weight $M_n$ of between 7,000 and 12,000 Daltons.

22. The method according to claim 1, wherein the polycarbonate to which the end-capping reagent is added has a hydroxyl end group content of at least 25%.

23. The method according to claim 22, wherein the polycarbonate to which the end-capping reagent is added has a hydroxyl end group content of at least 40%.

24. An end-capping reagent comprising a symmetrical activated carbonate and a compound A, wherein compound A has the structure,

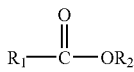

wherein $R_1$ is selected from the group consisting of a branched $C_8$–$C_{40}$ alkyl and a linear $C_8$–$C_{40}$ alkyl; and $R_2$ is selected from the group consisting of hydrogen, a branched $C_3$–$C_{40}$ alkyl, a linear $C_1$–$C_{40}$ alkyl $C_6$–$C_{30}$ aryl, and $C_7$–$C_{30}$ aralkyl group,
or wherein compound A is an esterified polyol having the formula $C(COCOR_3)_4$ wherein $R_3$ is a $C_{10}$–$C_{40}$ alkyl or a $C_{10}$–$C_{40}$ alkenyl group.

25. The end-capping reagent of claim 24, wherein the molar ratio of symmetrical activated carbonate to compound A in the end-capping reagent is between 0.5 and 2.0.

26. The end-capping reagent of claim 25, wherein the molar ratio of symmetrical activated carbonate to compound A in the end-capping reagent is between 1.1 and 2.0.

27. The end-capping reagent of claim 24, wherein compound A of the end-capping reagent is selected from the group consisting of lauric acid, myristic acid, palmitic acid, stearic acid, arachidic acid, behenic acid, lignoceric acid, the alkyl esters of these acids, and their aryl esters.

28. The end-capping reagent of claim 27, wherein compound A of the end-capping reagent is stearic acid.

29. The end-capping reagent of claim 24, wherein compound A is an esterified polyol and is penta erythritol-tetra-stearate (PETS).

30. The method according to claim 24, wherein the symmetrical activated carbonate of the end-capping reagent has the structure,

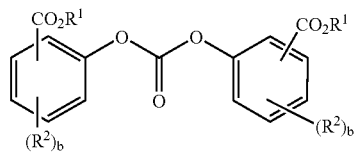

wherein $R^1$ is a $C_1$–$C_{20}$ alkyl radical, $C_4$–$C_{20}$ cycloalkyl radical, or $C_4$–$C_{20}$ aromatic radical; $R^2$ is a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and b is independently at each occurrence an integer 0–4.

31. The end-capping reagent of claim 30, wherein the symmetrical activated carbonate of the end-capping reagent is selected from the group consisting of: bis-methyl salicylate carbonate (BMSC), BPA-bis-methyl salicylate carbonate, bis-ethyl salicylate carbonate, bis-propyl salicylate carbonate, bis-2-benzoylphenyl carbonate, bis-phenyl salicyl carbonate, and bis-benzyl salicyl carbonate.

32. The end-capping reagent of claim 31, wherein the symmetrical activated carbonate of the end-capping reagent is bis-methyl salicylate carbonate (BMSC).

33. The end-capping reagent of claim 24, wherein the symmetrical activated carbonate of the end-capping reagent is bis-methyl salicylate carbonate (BMSC) and compound A is stearic acid.

34. A method for making a molded article comprising the steps of:
(i) combining a polycarbonate having free terminal OH groups with an end-capping reagent comprising a symmetrical activated carbonate and a compound A, wherein compound A has the structure,

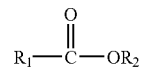

wherein $R_1$ is selected from the group consisting of a branched $C_8$–$C_{40}$ alkyl and a linear $C_8$–$C_{40}$ alkyl; and $R_2$ is selected from the group consisting of hydrogen, a branched $C_3$–$C_{40}$ alkyl, a linear $C_1$–$C_{40}$ alkyl, $C_6$–$C_{30}$ aryl, and $C_7$–$C_{30}$ aralkyl group,
or wherein compound A is an esterified polyol having the formula $C(COCOR_3)_4$ wherein $R_3$ is a $C_{10}$–$C_{40}$ alkyl or a $C_{10}$–$C_{40}$ alkenyl group,
whereby the end-capping reagent reacts with at least some of the free hydroxyl end groups of the polycarbonate to produce an end-capped polycarbonate comprising optionally substituted aliphatic ester end groups, and
(ii) forming a molded article from the end-capped polycarbonate produced in step (i).

35. A molded article produced by the method comprising the steps of:
(i) combining a polycarbonate having free terminal OH groups with an end-capping reagent comprising a symmetrical activated carbonate and a compound A, wherein compound A has the structure,

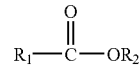

wherein $R_1$ is selected from the group consisting of a branched $C_8$–$C_{40}$ alkyl and a linear $C_8$–$C_{40}$ alkyl; and $R_2$ is selected from the group consisting of hydrogen, a branched $C_3$–$C_{40}$ alkyl, a linear $C_1$–$C_{40}$ alkyl, $C_6$–$C_{30}$ aryl, and $C_7$–$C_{30}$ aralkyl group,
or wherein compound A is an esterified polyol having the formula $C(COCOR_3)_4$ wherein $R_3$ is a $C_{10}$–$C_{40}$ alkyl or a $C_{10}$–$C_{40}$ alkenyl group,
whereby the end-capping reagent reacts with at least some of the free hydroxyl end groups of the polycarbonate to produce an end-capped polycarbonate comprising optionally substituted aliphatic ester end groups, and
(ii) forming a molded article from the end-capped polycarbonate produced in step (i).

* * * * *

UNITED STATES PATENT AND TRADEMARK OFFICE
CERTIFICATE OF CORRECTION

PATENT NO.         : 7,105,626 B2
APPLICATION NO. : 10/938337
DATED              : September 12, 2006
INVENTOR(S)        : Brack et al.

It is certified that error appears in the above-identified patent and that said Letters Patent is hereby corrected as shown below:

Claim 7, Line 60 should read: --$C_1$-$C_{20}$ alkylthio radical, $C_4$-$C_{20}$ cycloalkylthio radical,--;

Claim 30, Line 34 should read: --The end-capping reagent of claim 24, wherein the--.

Signed and Sealed this

Twenty-eighth Day of November, 2006

JON W. DUDAS
*Director of the United States Patent and Trademark Office*